United States Patent
Tsujimoto et al.

(10) Patent No.: US 8,266,895 B2
(45) Date of Patent: Sep. 18, 2012

(54) $O_3$ PRODUCTION APPARATUS AND EXHAUST GAS PURIFICATION SYSTEM FOR INTERNAL COMBUSTION ENGINE

(75) Inventors: Kenichi Tsujimoto, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 407 days.

(21) Appl. No.: 12/451,079

(22) PCT Filed: Apr. 11, 2008

(86) PCT No.: PCT/JP2008/057559
§ 371 (c)(1),
(2), (4) Date: Oct. 26, 2009

(87) PCT Pub. No.: WO2008/136278
PCT Pub. Date: Nov. 13, 2008

(65) Prior Publication Data
US 2010/0064669 A1    Mar. 18, 2010

(30) Foreign Application Priority Data
Apr. 27, 2007  (JP) .................... 2007-118566

(51) Int. Cl.
*F01N 3/00*   (2006.01)
(52) U.S. Cl. ............. 60/286; 60/275; 60/295; 60/297; 60/301; 60/303
(58) Field of Classification Search ........... 60/286
See application file for complete search history.

(56) References Cited

U.S. PATENT DOCUMENTS

| 3,083,209 A | * | 3/1963 | Habib et al. ............. 549/431 |
| 5,888,271 A | * | 3/1999 | Tanimura et al. ............ 95/12 |
| 6,212,883 B1 | * | 4/2001 | Kang ..................... 60/275 |
| 2004/0188238 A1 | * | 9/2004 | Hemingway et al. ...... 204/164 |
| 2006/0207428 A1 | | 9/2006 | Ibe et al. |
| 2009/0019844 A1 | * | 1/2009 | Hirata et al. ............. 60/311 |
| 2009/0064664 A1 | * | 3/2009 | Hirata et al. ............. 60/286 |

FOREIGN PATENT DOCUMENTS

| JP | A-58-098124 | 6/1983 |
| JP | A-2001-073748 | 3/2001 |
| JP | A-2004-245135 | 9/2004 |
| JP | A-2004-353619 | 12/2004 |
| JP | 2005130629 A * | 5/2005 |
| JP | A-2005-130629 | 5/2005 |

(Continued)

OTHER PUBLICATIONS

English translation of JP 2006-329045A.*

(Continued)

*Primary Examiner* — Thomas Denion
*Assistant Examiner* — Jason Shanske
(74) *Attorney, Agent, or Firm* — Oliff & Berridge, PLC

(57) ABSTRACT

An object of the present invention is to produce $O_3$ to be supplied to the exhaust gas of an internal combustion engine while suppressing deterioration of the fuel economy. An $O_3$ production apparatus according to the present invention is an $O_3$ production apparatus that produces $O_3$ to be supplied to the exhaust gas of an internal combustion engine by generating a plasma, when the operation state of the internal combustion engine is a decelerating operation state in which the engine load becomes lower.

12 Claims, 6 Drawing Sheets

FOREIGN PATENT DOCUMENTS

| | | |
|---|---|---|
| JP | A-2006-257948 | 9/2006 |
| JP | 2006329045 A * | 12/2006 |
| JP | 2006348888 A * | 12/2006 |
| JP | A-2006-329045 | 12/2006 |
| JP | 2007077971 A * | 3/2007 |
| JP | A-2007-077971 | 3/2007 |
| WO | WO 2006/135073 A1 | 12/2006 |
| WO | WO 2007/032564 A1 | 3/2007 |

OTHER PUBLICATIONS

English translation of JP 2005-130629A.*

Office Action issued in Chinese Patent Application No. 200880013744.X dated Apr. 28, 2011 (with translation).

European Search Report issued in European Application No. 08740615.3 dated Jun. 9, 2011.

* cited by examiner

O₃ PRODUCTION APPARATUS AND EXHAUST GAS PURIFICATION SYSTEM FOR INTERNAL COMBUSTION ENGINE

This application is the national phase application under 35 U.S.C. §371 of PCT international application No. PCT/JP2008/057559 filed on Apr. 11, 2008, which claims priority to Japanese patent application No. 2007-118566 filed on Apr. 27, 2007, the contents of which are incorporated herein by reference.

TECHNICAL FIELD

The present invention relates to an $O_3$ production apparatus that produces $O_3$ to be supplied to the exhaust gas of an internal combustion engine and to an exhaust gas purification system for an internal combustion engine.

BACKGROUND ART

An $O_3$ production apparatus that produces $O_3$ to be supplied to the exhaust gas of an internal combustion engine by generating a plasma has been known. Supply of $O_3$ produced by such an $O_3$ production apparatus to the exhaust gas promotes oxidation of NO in the exhaust gas, whereby NO can be changed into $NO_2$. $NO_2$ is stored more easily in an NOx storage reduction catalyst (which will be simply referred to as an "NOx catalyst" hereinafter) as compared to NO. Therefore, in the case where an NOx catalyst is provided in the exhaust passage of the internal combustion engine, changing NO in the exhaust gas into $NO_2$ can promote storage of NOx in the NOx catalyst.

Furthermore, in the case where a particulate filter (which will be simply referred to as a "filter" hereinafter) that traps particulate matter (which will be hereinafter referred to as "PM") in the exhaust gas is provided in the exhaust passage of the internal combustion engine, supplying $O_3$ produced by the $O_3$ production apparatus to the filter when removing PM trapped in the filter can promote oxidation of PM trapped in the filter.

Japanese Patent Application Laid-Open No. 2006-257948 discloses a technology in which PM in the exhaust gas is absorbed by a honeycomb structure by the effect of an electrical field. This Japanese Patent Application Laid-Open No. 2006-257948 also discloses a technology in which $O_3$ is produced by an $O_3$ production apparatus including a discharger and a pulse battery, and $O_3$ thus produced is supplied as an oxidation prompter to the honeycomb structure.

Japanese Patent Application Laid-Open No. 2004-353619 discloses a technology in which NO in the exhaust gas is changed into $NO_2$ by $O_3$ produced by generating a plasma, and $NO_2$ is reduced into $N_2$ by an $NO_2$ catalyst. Japanese Patent Application Laid-Open No. 2001-73748 discloses a technology in which the quantity of $NO_2$ is increased when the temperature of an NOx catalyst is low.

DISCLOSURE OF THE INVENTION

In the case where $O_3$ is produced by an $O_3$ production apparatus, electric power is consumed to generate a plasma. This may lead to deterioration of the fuel economy.

An object of the present invention is to provide a technology that enables production of $O_3$ to be supplied to the exhaust gas of an internal combustion engine while suppressing deterioration of the fuel economy.

An $O_3$ production apparatus according to the present invention is an $O_3$ production apparatus that produces $O_3$ to be supplied to the exhaust gas of an internal combustion engine by generating a plasma, characterized in that it produces $O_3$, when the operation state of said internal combustion engine is a decelerating operation state in which the engine load becomes lower.

When the operation state of the internal combustion engine is a decelerating operation state, deterioration of the fuel economy is unlikely to occur even if electric power is consumed. Therefore, according to the present invention, it is possible to produce $O_3$ to be supplied to the exhaust gas of the internal combustion engine while suppressing deterioration of the fuel economy.

The present invention may be applied to an internal combustion engine mounted on a hybrid vehicle that can selectively use, as the driving power, one or both of the power output of the internal combustion engine and the power output of a motor generator. When this is the case, a plasma may be generated using electric power generated by the motor generator when the operation state of the internal combustion engine is a decelerating operation state in which the engine load becomes lower.

Thus, when the present invention is applied to an internal combustion engine mounted on a hybrid vehicle, deterioration of the fuel economy can be further suppressed.

In the above-described case, if a charge amount of a battery is larger than a specific charge amount when the operation state of the internal combustion engine is a decelerating operation state in which the engine load becomes lower, the plasma may be generated using electric power generated by the motor generator.

Here, the specific charge amount is a value equal to or higher than a threshold value that allows a determination that the charge amount of the battery is unduly small if the charge amount of the battery is not larger than the specific charge amount.

According to this, if the charge amount of the battery is not larger than the specific charge amount, electric power generated by the motor generator is supplied to the battery to increase the charge amount of the battery. Therefore, the charge amount of the battery can be prevented from becoming unduly small.

An exhaust gas purification system for an internal combustion engine according to the present invention may comprise the above-described $O_3$ production apparatus, an $O_3$ storage apparatus that stores $O_3$ produced by the $O_3$ production apparatus, and an NOx storage reduction catalyst provided in the exhaust passage of the internal combustion engine. In this case, $O_3$ stored in the $O_3$ storage apparatus may be supplied to the exhaust gas flowing in the exhaust passage upstream of the NOx storage reduction catalyst when the operation state of the internal combustion engine is an accelerating operation state in which the engine load becomes higher.

When the operation state of the internal combustion engine is an accelerating operation state, the quantity of NOx discharged from the internal combustion engine becomes larger, namely the quantity of NO in the exhaust gas becomes larger. By supplying $O_3$ stored in the $O_3$ storage apparatus to the exhaust gas flowing in the exhaust passage upstream of the NOx catalyst when the operation state of the internal combustion engine is an accelerating operation state, changing of NO, the quantity of which has increased, into $NO_2$ is promoted. Thus, storage of NOx in the NOx catalyst can be promoted. Therefore, according to the above-described exhaust gas purification system, emission of NO to the atmosphere during the time when the operation state of the internal combustion engine is an accelerating operation state can be suppressed.

While the operating state of the internal combustion engine is an accelerating operation state, the higher the increase rate of the engine load of the internal combustion engine is, the larger the quantity of NO in the exhaust gas is. In addition, the lower the temperature of the NOx catalyst is, the harder storage of NO in the NOx is.

In view of the above, in the above-described exhaust gas purification system, the higher the increase rate of the engine load of the internal combustion engine is, or the lower the temperature of the NOx storage reduction catalyst is, the larger the quantity of $O_3$ supplied to the exhaust gas may be made.

The larger the quantity of $O_3$ supplied to the exhaust gas is, the more changing of NO in the exhaust gas into $NO_2$ is promoted. Therefore, according to the above feature, emission of NO to the atmosphere during the time when the operation state of the internal combustion engine is an accelerating operation state can be further suppressed.

An exhaust gas purification system according to the present invention may comprise the $O_3$ production apparatus as described above, an $O_3$ storage apparatus that stores $O_3$ produced by the $O_3$ production apparatus, and a particulate filter that is provided in the exhaust passage of the internal combustion engine and traps particulate matter in the exhaust gas. In this case, $O_3$ stored in the $O_3$ storage apparatus may be supplied to the particulate filter when removing particulate matter trapped in the particulate filter.

Supply of $O_3$ to the filter can promote oxidation of PM in the filter. Therefore, according to the above-described exhaust gas purification system, removal of PM from the filter can be promoted.

Removal of PM trapped in the filter is sometimes performed also when the operation state of the internal combustion engine is a decelerating operation state in which the engine load becomes lower.

In view of this, in the above-described exhaust gas purification system, when removing particulate matter trapped in the filter while the operation state of the internal combustion engine is a decelerating operation state in which the engine load becomes lower, $O_3$ produced by the $O_3$ production apparatus may be supplied to the filter without being stored in the $O_3$ storage apparatus.

Thus, removal of PM can be promoted even in the case where removal of PM trapped in the filter is performed when the operation state of the internal combustion engine is a decelerating operation state.

THE BEST MODE FOR CARRYING OUT THE INVENTION

In the following, specific embodiments of the $O_3$ production apparatus and the exhaust gas purification system for an internal combustion engine according to the present invention will be described with reference to the drawings.

Embodiment 1

<General Configuration of Air-Intake and Exhaust System of Internal Combustion Engine>

Figure 1:
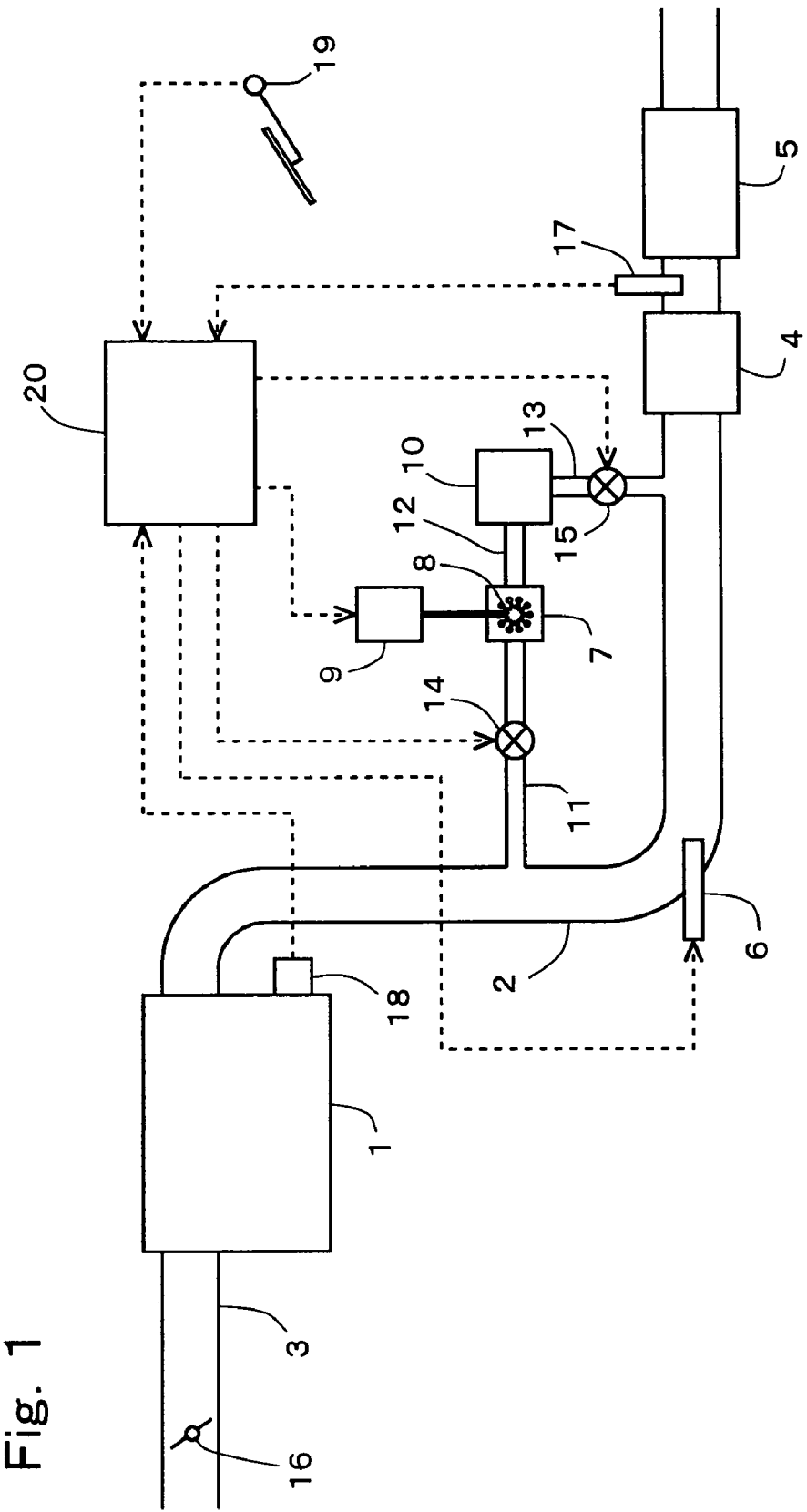
FIG. 1 is a diagram showing the general configuration of an air-intake and exhaust system of an internal combustion engine according to embodiment 1.

Here, a description will be made of an exemplary case in which the present invention is applied to a diesel engine for driving a vehicle. FIG. 1 is a diagram showing the general configuration of an air-intake and exhaust system of an internal combustion engine according to this embodiment.

The internal combustion engine 1 is a diesel engine for driving a vehicle. The internal combustion engine 1 is connected with an intake passage 3 and an exhaust passage 2. A throttle valve 16 is provided in the intake passage 3. An NOx catalyst 4 is provided in the exhaust passage 2. In addition, a filter 5 is provided in the exhaust passage 2 downstream of the NOx catalyst 4.

A fuel addition valve 6 that adds fuel serving as a reducing agent to the exhaust gas is provided in the exhaust passage 2 upstream of the NOx catalyst 4. A temperature sensor 17 that senses the temperature of the exhaust gas is provided between the NOx catalyst 4 and the filter 5 in the exhaust passage 2.

In this embodiment, an $O_3$ production apparatus 7 that produces $O_3$ to be supplied to the exhaust gas flowing in the exhaust passage 2 is provided in the vicinity of the exhaust passage 2. The $O_3$ production apparatus 7 is equipped with a plasma generation apparatus 8 that generates a plasma. The plasma generation apparatus 8 generates a plasma with application of voltage by a battery 9.

The $O_3$ production apparatus 7 is connected with one end of a first communication passage 11. The other end of the first communication passage 11 is connected to the exhaust passage 2 upstream of the NOx catalyst 4. The first communication passage 11 is provided with a first valve 14. As the first valve 14 is opened, the first communication passage 11 is opened, whereby a portion of the exhaust gas is introduced into the $O_3$ production apparatus 7. Then, a plasma is generated in the $O_3$ production apparatus 7 by the plasma generation apparatus 8, whereby $O_2$ in the exhaust gas is excited, and $O_3$ is produced consequently. The quantity of exhaust gas introduced into the $O_3$ production apparatus 7 is controlled by controlling the degree of opening of the first valve 14.

The $O_3$ production apparatus 7 is connected with one end of a second communication passage 12. The other end of the second communication passage 12 is connected to an $O_3$ tank 10 that stores $O_3$. Thus, $O_3$ produced in the $O_3$ production apparatus 7 is introduced into the $O_3$ tank 10 through the second communication passage 12 and stored in the $O_3$ tank. In this embodiment, the $O_3$ tank 10 corresponds to the $O_3$ storage apparatus according to the present invention.

The $O_3$ tank 10 is connected with one end of a third communication passage 13. The other end of the third communication passage 13 is connected to the exhaust passage 2 upstream of the NOx catalyst 4. The third communication passage 13 is provided with a second valve 15. As the second valve 15 is opened, the third communication passage 13 is opened, whereby $O_3$ stored in the $O_3$ tank 10 is supplied to the exhaust gas flowing in the exhaust passage 2. The quantity of $O_3$ supplied to the exhaust gas can be controlled by controlling the degree of opening of the second valve 15.

To the internal combustion engine 1 having the above-described configuration is annexed an electronic control unit (ECU) 20 that controls the internal combustion engine 1. The ECU 20 is electrically connected with the temperature sensor 17, a crank position sensor 18, and an accelerator opening degree sensor 19. Output signals from them are input to the ECU 20.

The crank position sensor 18 is a sensor that senses the crank angle of the internal combustion engine 1. The accelerator opening degree sensor 19 is a sensor that senses the opening degree of the accelerator of a vehicle on which the internal combustion engine 1 is mounted. The ECU 20 calculates the engine speed of the internal combustion engine 1 based on an output value of the crank position sensor 18, and calculates the engine load of the internal combustion engine 1 based on an output value of the accelerator opening degree sensor 19. ECU 20 also estimates the temperature of the NOx catalyst 4 based on an output value of the temperature sensor 17.

The ECU 20 is also electrically connected with the throttle valve 16, the fuel addition valve 6, the battery 9, the first valve 14, the second valve 15, and a fuel injection valve of the internal combustion engine 1, which are controlled by the ECU 20.

<Method of Producing $O_3$>

Figure 2:
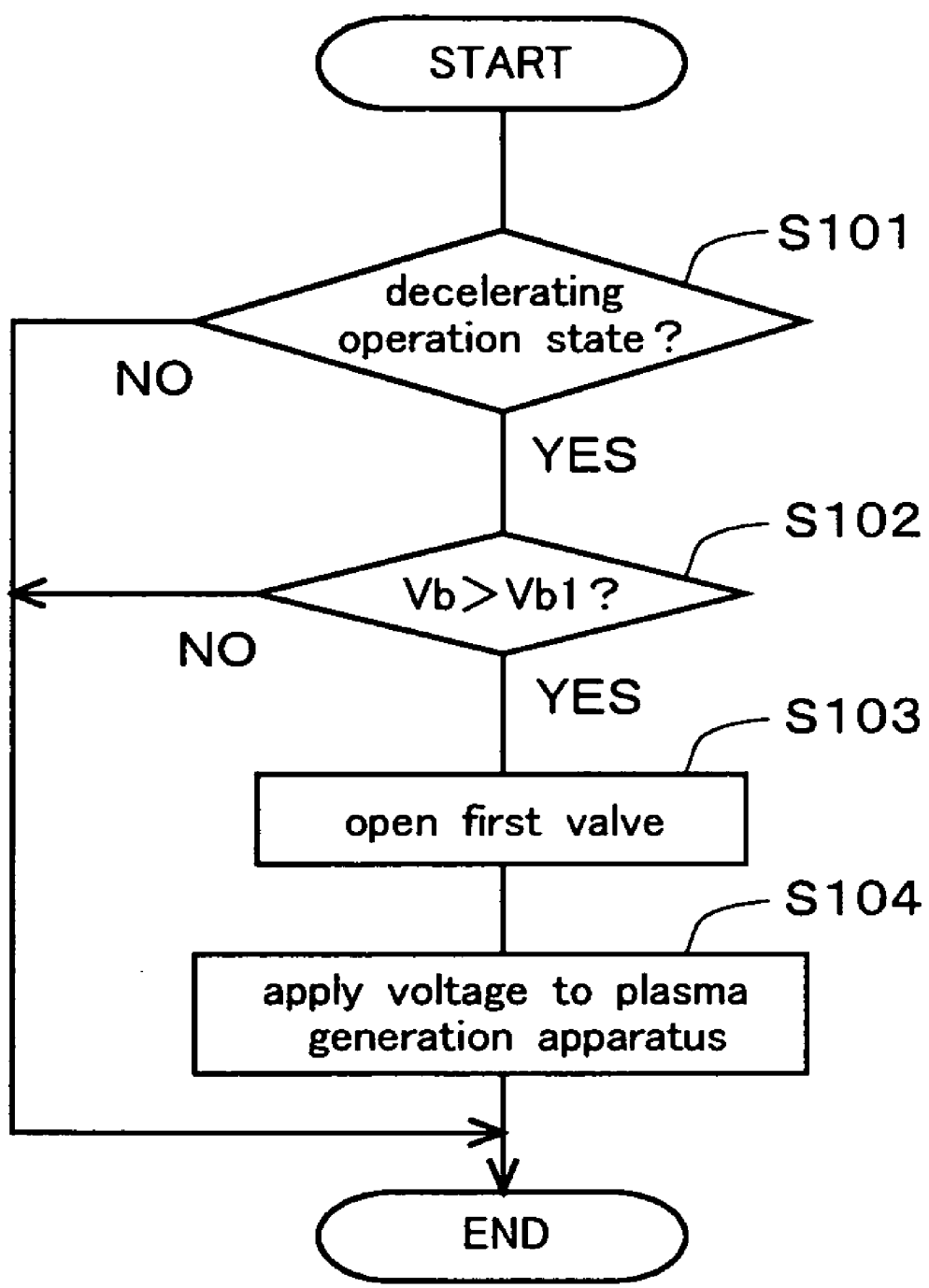
FIG. 2 is a flow chart of a routine of $O_3$ production by an $O_3$ production apparatus according to embodiment 1.

Here, an $O_3$ producing routine for producing $O_3$ in the $O_3$ production apparatus 7 according to this embodiment will be described with reference to the flow chart shown in FIG. 2. This routine is stored in the ECU 20 in advance and executed at predetermined intervals during the operation of the internal combustion engine 1.

In this routine, first in step S101, the ECU 20 determines whether or not the operation state of the internal combustion engine 1 is a decelerating operation state in which the engine load becomes lower. If the determination in step S101 is affirmative, the ECU 20 proceeds to step S102, and if the determination is negative, the ECU 20 once terminates execution of this routine.

In step S102, the ECU 20 determines whether or not the charge amount Vb of the battery 9 is larger than a first specific charge amount Vb1. Here, the first specific charge amount Vb1 is a threshold value below which it can be determined that if production of $O_3$ by the $O_3$ production apparatus 7 is performed, the charge amount Vb of the battery 9 can become unduly small. The first specific charge amount Vb1 is determined in advance based on, for example, experiments. If the determination in step S102 is affirmative, the ECU 20 proceeds to step S103, and if the determination is negative, the ECU 20 once terminates execution of this routine.

In step S103, the ECU 20 causes the first valve 14 to open. Thereby, a portion of the exhaust gas flowing in the exhaust passage 2 is introduced into the $O_3$ production apparatus 7 through the first communication passage 11.

Then, the ECU 20 proceeds to step S104, where a plasma is generated in the $O_3$ production apparatus 7 by application of voltage to the plasma generation apparatus 8 from the battery 9. Thus, $O_3$ is generated in the $O_3$ production apparatus 7. Then, $O_3$ thus produced is introduced into the $O_3$ tank 10 through the second communication passage 12 and stored in the $O_3$ tank 10. Thereafter, the ECU 20 once terminates execution of this routine.

In the above-described routine, $O_3$ is generated utilizing electric power of the battery 9 when the operation state of the internal combustion engine 1 is a decelerating operation state. When the operation state of the internal combustion engine 1 is a decelerating operation state, deterioration of the fuel economy is unlikely to be caused even if electric power is consumed. Therefore, according to this embodiment, it is possible to produce $O_3$ to be supplied to the exhaust gas of the internal combustion engine 1 while suppressing deterioration of the fuel economy.

<NOx Storage Promotion Control>

When $O_3$ is supplied to the exhaust gas, oxidation of NO in the exhaust gas is promoted, namely changing from NO into $NO_2$ is promoted. $NO_2$ is stored in NOx catalyst 4 more easily than NO. Therefore, by promoting changing from NO into $NO_2$, storage of NOx in the NOx catalyst 4 can be promoted.

Figure 3:
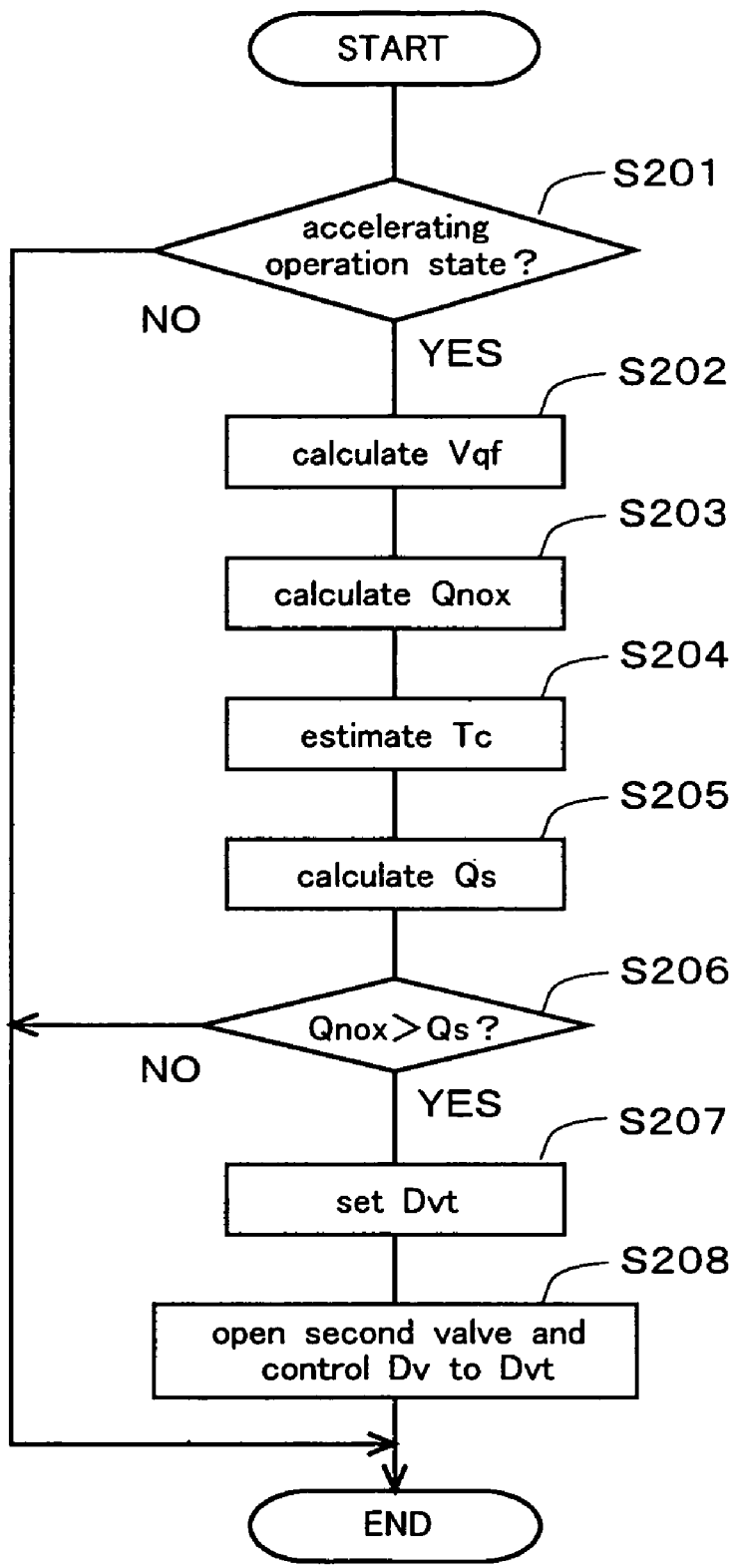
FIG. 3 is a flow chart of a routine of an NOx storage promotion control according to embodiment 1.

Here, a routine of an NOx storage promotion control for promoting storage of NOx in the NOx catalyst 4 according to this embodiment will be described with reference to the flow chart shown in FIG. 3. This routine is stored in the ECU 20 in advance and executed repeatedly at predetermined intervals during the operation of the internal combustion engine 1.

In this routine, first in step S201, the ECU 20 determines whether or not the operation state of the internal combustion engine 1 is a accelerating operation state in which the engine load becomes higher. If the determination in step S201 is affirmative, the ECU 20 proceeds to step S202, and if the determination is negative, the ECU 20 once terminates execution of this routine.

In step S202, the ECU 20 calculates the increase rate Vqf of the engine load of the internal combustion engine 1.

Then, the ECU 20 calculates the quantity Qnox of NOx discharged from the internal combustion engine 1 based on the increase rate Vqf of the engine load of the internal combustion engine 1. The higher the increase rate Vqf of the engine load of the internal combustion engine 1 is, the larger the quantity Qnox of NOx discharged from the internal combustion engine 1 is. The relationship between the increase rate Vqf of the engine load of the internal combustion engine 1 and the quantity Qnox of NOx discharged from the internal combustion engine 1 may be determined by, for example, experiments, and the relationship may be stored in the form of a map in the ECU 20 in advance.

Then, the ECU 20 proceeds to step S204, where it estimates the temperature Tc of the NOx catalyst 4 based on an output value of the temperature sensor 17.

Then the ECU 20 proceeds to step S205, where it calculates the quantity Qs of NOx that the NOx catalyst 4 is capable of storing based on the temperature Tc of the NOx catalyst 4. The lower the temperature Tc of the NOx catalyst 4 is, the smaller the quantity of NOx that the NOx catalyst 4 is capable of storing is. The relationship between the temperature Tc of the NOx catalyst 4 and the quantity of NOx that the NOx catalyst 4 is capable of storing may be determined by, for example, experiments, and the relationship may be stored in the form of a map in the ECU 20 in advance.

Then, the ECU 20 proceeds to step S206, where it determines whether or not the quantity Qnox of NOx discharged from the internal combustion engine 1 is larger than the quantity Qs of NOx that the NOx catalyst 4 is capable of storing. If the determination in step S206 is affirmative, the ECU 20 proceeds to step S207, and if the determination is negative, the ECU 20 once terminates execution of this routine.

In step S207, the ECU 20 sets a target opening degree Dvt of the second valve 15 in opening the second valve 15 in step S208 that will be described later. If the second valve 15 is opened, $O_3$ stored in the $O_3$ tank 10 is supplied to the exhaust gas flowing in the exhaust passage 2 upstream of the NOx catalyst 4, through the third communication passage 13. On this occasion, the larger the opening degree Dv of the second valve 15 is, the larger the quantity of $O_3$ supplied to the exhaust gas is.

As described above, the higher the increase rate Vqf of the engine load of the internal combustion engine 1 is, the larger the quantity Qnox of NOx discharged from the internal combustion engine 1 is. The lower the temperature Tc of the NOx catalyst 4 is, the smaller the quantity of NOx that the NOx catalyst 4 is capable of storing is. Therefore, in step S207, the ECU 20 sets the target opening degree Dvt of the second valve 15, where the higher the increase rate Vqf of the engine load of the internal combustion engine 1 is, and the lower the temperature Tc of the NOx catalyst 4 is, the larger the value of the target opening degree Dvt of the second valve 15 set by the ECU 20 is. The relationship between the increase rate Vqf of the engine load of the internal combustion engine 1, the temperature Tc of the NOx catalyst 4, and the target opening degree Dvt of the second valve 15 is determined by, for example, experiments, and the relationship is stored in the form of a map in the ECU 20 in advance.

Then, the ECU 20 proceeds to step S208, where it causes the second valve 15 to open and controls the opening degree Dv of the second calve 15 to the target opening degree Dvt. Thus, $O_3$ is supplied to the exhaust gas flowing in the exhaust passage 2 upstream of the NOx catalyst 4. Thereafter, the ECU 20 once terminates execution of this routine.

When the operation state of the internal combustion engine 1 is an accelerating operation state, the quantity of NOx discharged from the internal combustion engine 1 becomes larger, namely the quantity of NO in the exhaust gas becomes larger. According to the above-described routine, if the quantity Qnox of NOx discharged from the internal combustion engine 1 is larger than the quantity Qs of NOx that the NOx catalyst 4 is capable of storing when the operation state of the internal combustion engine 1 is an accelerating operation state, $O_3$ stored in the $O_3$ tank 10 is supplied to the exhaust gas flowing in the exhaust passage 2 upstream of the NOx catalyst 4. This can promote changing of NO, the quantity of which has increased, into $NO_2$. In consequence, storage of NOx in the NOx catalyst 4 can be promoted. Therefore, according to this embodiment, emission of NO to the atmosphere during the time when the operation state of the internal combustion engine 1 is an accelerating operation state can be suppressed.

According to the above-described routine, when supplying $O_3$ to the exhaust gas flowing in the exhaust passage 2 upstream of the NOx catalyst 4, the higher the increase rate Vqf of the engine load of the internal combustion engine 1 is, and the lower the temperature Tc of the NOx catalyst 4 is, the larger the quantity of $O_3$ supplied to the exhaust gas is made. The larger the quantity of $O_3$ supplied to the exhaust gas is, the more changing of NO in the exhaust gas into $NO_2$ can be promoted. Therefore, according to this embodiment, emission of NO to the atmosphere during the time in which the operation state of the internal combustion engine 1 is an accelerating operation state can be further suppressed.

Embodiment 2

Figure 4:
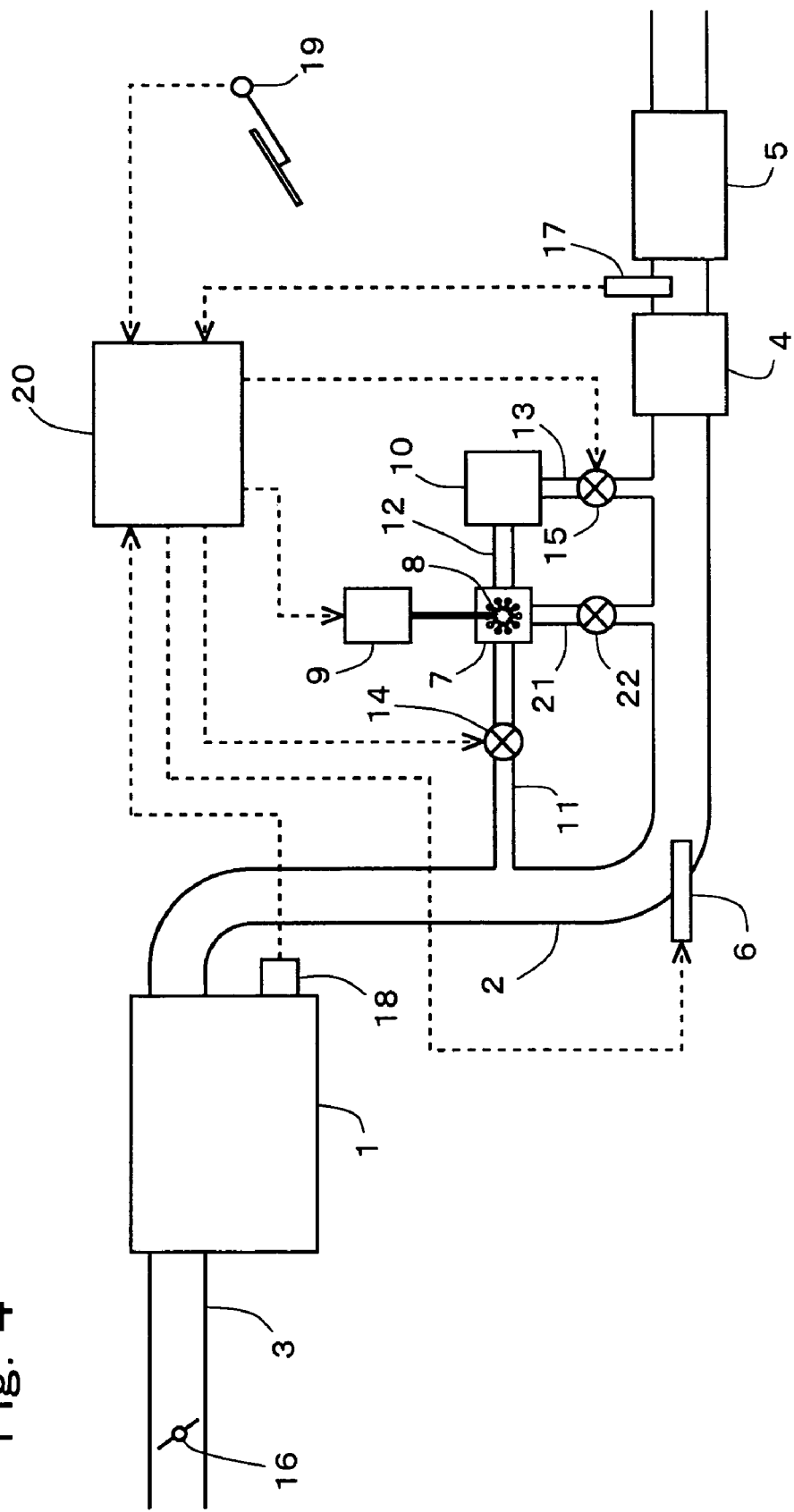
FIG. 4 is a diagram showing the general configuration of an air-intake and exhaust system of an internal combustion engine according to embodiment 2.

FIG. 4 is a diagram showing the general configuration of an air-intake and exhaust system of an internal combustion engine according to this embodiment. In this embodiment, the $O_3$ production apparatus 7 is connected with one end of a fourth communication passage 21. The other end of the fourth communication passage 21 is connected to the exhaust passage 2 at a position upstream of the NOx catalyst 4. The fourth communication passage 21 is provided with a third valve 22.

If the third valve 22 is opened when $O_3$ is being produced by the $O_3$ production apparatus 7, the fourth communication passage 21 is opened, and $O_3$ produced in the $O_3$ production apparatus 7 is supplied to the exhaust gas flowing in the exhaust passage 2. The quantity of $O_4$ supplied to the exhaust gas is controlled by controlling the opening degree of the third valve 22. The third valve 22 is electrically connected to the ECU 20 and controlled by the ECU 20. The configuration other than described above is the same as the general configuration of the air-intake and exhaust system of the internal combustion engine according to embodiment 1, therefore like elements will be denoted by like reference numerals, and a description thereof will be omitted.

In this embodiment also, $O_3$ is produced by the $O_3$ production apparatus 7 in the same manner as in embodiment 1.

<Filter Regeneration Control>

Figure 5:
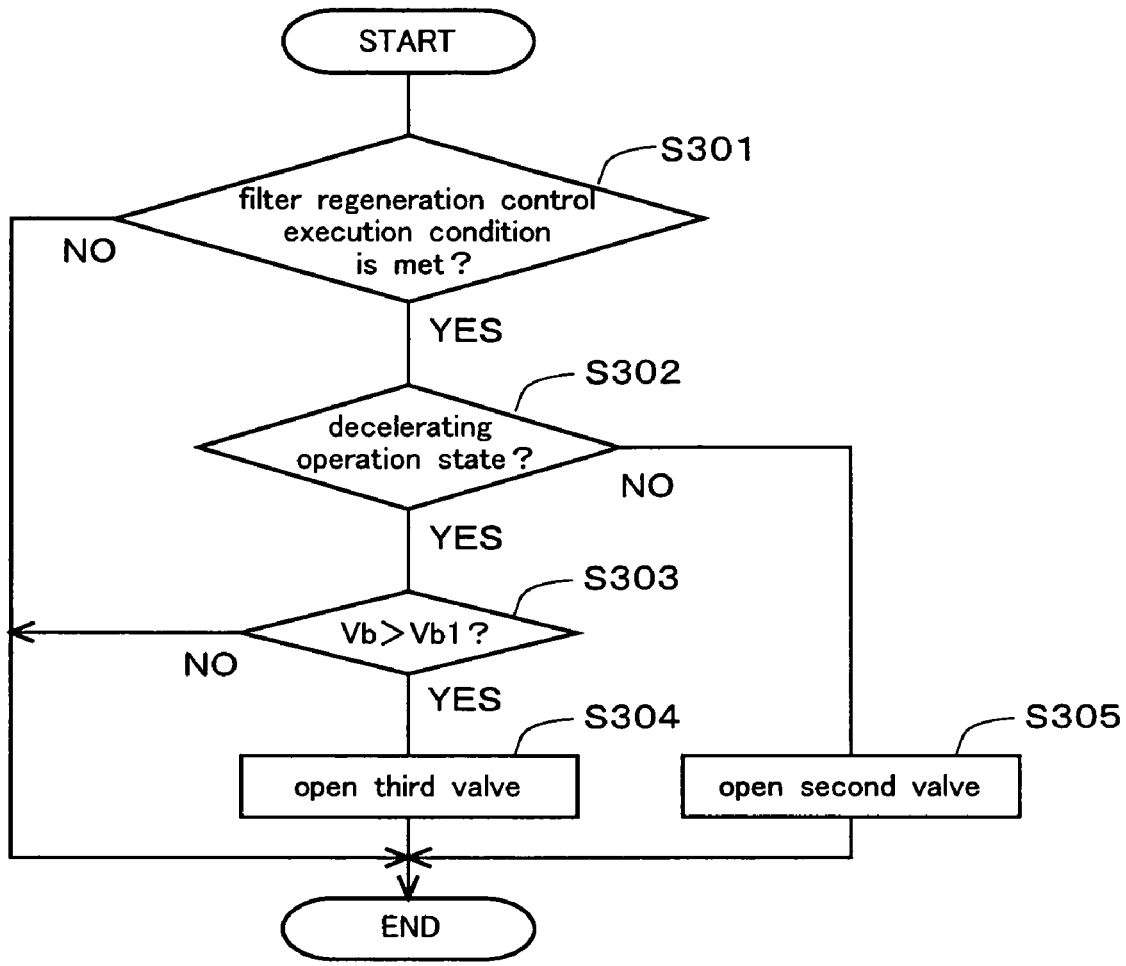
FIG. 5 is a flow chart of a routine of a filter regeneration control according to embodiment 2.

Here, a routine of a filter regeneration control for removing PM trapped in the filter 5 according to this embodiment will be described with reference to the flow chart shown in FIG. 5. This routine is stored in the ECU 20 in advance and executed repeatedly at predetermined intervals.

In this routine, first in step S301, the ECU 20 determines whether or not a condition for executing the filter generation process is met. Here, it may be determined that the condition for executing the filter regeneration control is met when the amount of PM trapped in the filter 5 becomes equal to or larger than a specific trapped amount, or when the integrated amount of the quantity of fuel injected in the internal combustion engine 1 becomes equal to or larger than a specific value. In this context, the specific trapped amount or the specific value is a value smaller than a threshold value above which it can be determined that there is a risk that back pressure in the exhaust passage 2 upstream of the filter 5 becomes unduly high. If the determination in step S301 is affirmative, the ECU 20 proceeds to step S302, and if the determination is negative, the ECU 20 once terminates execution of this routine.

In step S302, the ECU 20 determines whether or not the operation state of the internal combustion engine 1 is a decelerating operation state in which the engine load becomes lower. If the determination in step S302 is affirmative, the ECU 20 proceeds to step S303, and if the determination is negative, the ECU 20 proceeds to step S305.

In step S303, the ECU 20 determines whether or not the charge amount Vb of the battery 9 is larger than a first specific charge amount Vb1. Here, the first specific charge amount Vb1 is the same as the first specific charge amount Vb1 in the flow chart of the $O_3$ production routine shown in FIG. 2. Specifically, the first specific charge amount Vb1 is a threshold value for making a determination as to whether production of $O_3$ by the $O_3$ production apparatus 7 is to be executed or not. As described before, if the operation state of the internal combustion engine 1 is a decelerating operation state, and the charge amount Vb of the battery 9 is larger than the first specific charge amount Vb1, production of $O_3$ by the $O_3$ production apparatus 7 is executed. If the determination in step S303 is affirmative, the ECU 20 proceeds to step S304, and if the determination is negative, the ECU 20 once terminates execution of this routine.

In step S304, the ECU 20 causes the third valve 22 to open. Thereby, $O_3$ produced by the $O_3$ production apparatus 7 is supplied to the exhaust gas flowing in the exhaust passage 2 upstream of the NOx catalyst 4 through the fourth communication passage 21. Thus, $O_3$ is supplied, together with the exhaust gas, to the filter 5. Thereafter, the ECU 20 once terminates execution of this routine.

On the other hand, in step S305, the ECU 20 causes the second valve 15 to open. Thereby, $O_3$ stored in the $O_3$ tank is supplied to the exhaust gas flowing in the exhaust passage 2 upstream of the NOx catalyst 4. Thus, $O_3$ is supplied, together with the exhaust gas, to the filter 5. Thereafter, the ECU 20 once terminates execution of this routine.

According to the above-described routine, when the filter regeneration control is executed, if the operation state of the internal combustion engine 1 is a decelerating operation state and production of $O_3$ by the $O_3$ production apparatus 7 is being performed, $O_3$ produced by the $O_3$ production apparatus 7 is supplied to the filter 5 without being stored in the $O_3$ tank 10. On the other hand, when the filter regeneration control is executed, if the operation state of the internal combustion engine 1 is not a decelerating operation state, $O_3$ stored in the $O_3$ tank is supplied to the filter 5.

When $O_3$ is supplied to the filter 5, oxidation of PM in the filter 5 is promoted. Therefore, according to this embodiment, removal of PM from the filter 5 can be promoted.

In the filter regeneration control according to this embodiment, fuel may be added to the exhaust gas through the fuel addition valve 6. When this is the case, fuel added to the exhaust gas is oxidized in the NOx catalyst 4, and the temperature of the filter 5 is raised by oxidation heat generated thereby. In consequence, oxidation of PM in the filter 5 is promoted. In this case also, $O_3$ is supplied to the filter 5 when the filter regeneration control is executed as with the above-described case. This can further promote oxidation of PM in the filter 5.

Embodiment 3

Figure 6:
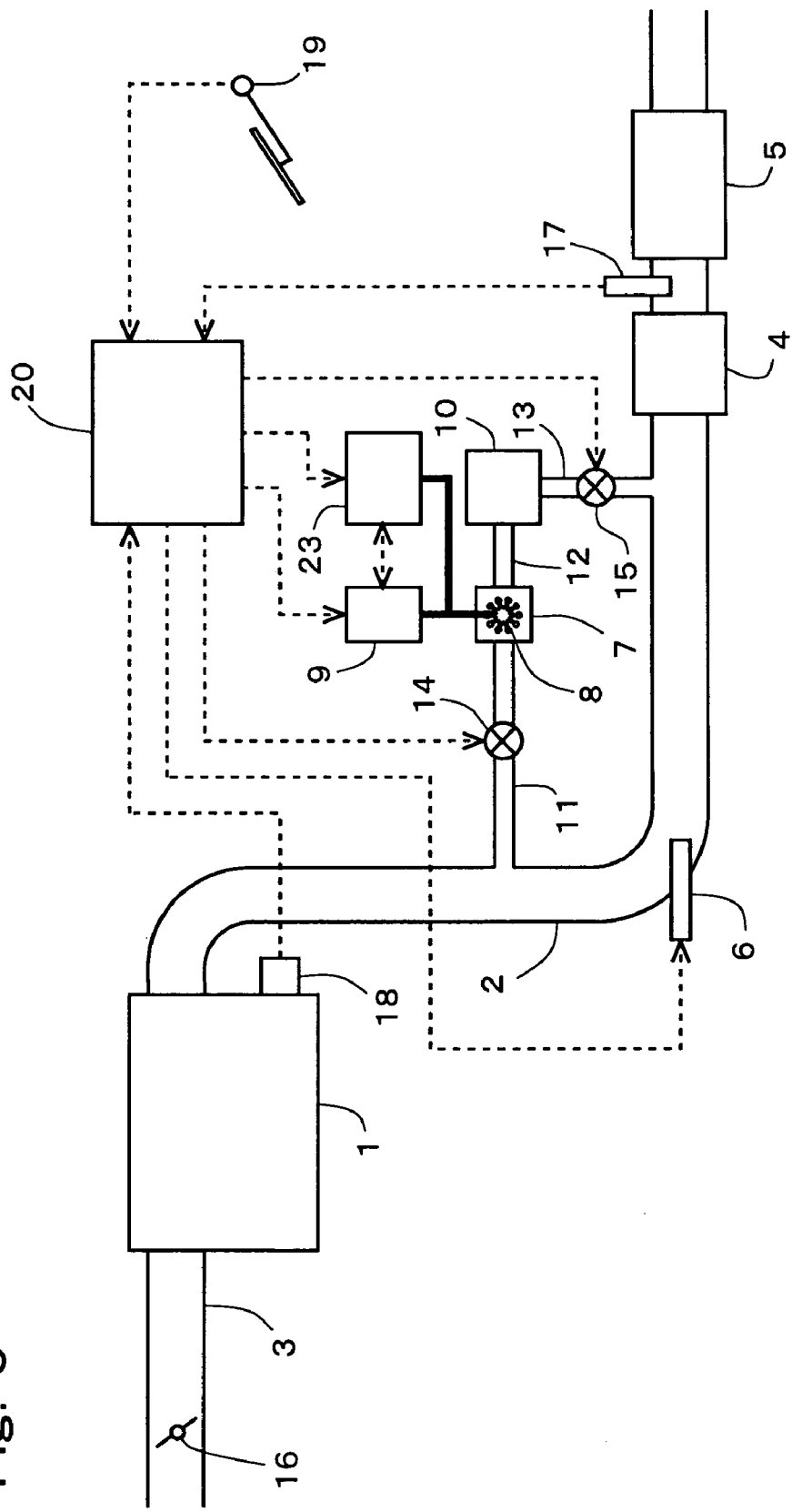
FIG. 6 is the general configuration of an air-intake and exhaust system of an internal combustion engine according to embodiment 3.

FIG. 6 is a diagram showing the generation configuration of an air-intake and exhaust system of an internal combustion engine according to this embodiment. In this embodiment, the internal combustion engine 1 is mounted on a hybrid vehicle that can selectively use, as the driving power, one or both of the power output of the internal combustion engine 1 and the power output of a motor generator 23. The motor generator 23 is electrically connected with a battery 9. The motor generator 23 can apply voltage to a plasma generation apparatus 8 of an $O_3$ production apparatus 7. The motor generator 23 is electrically connected with an ECU 20 and controlled by the ECU 20. The configuration other than described above is the same as the general configuration of the air-intake and exhaust system of the internal combustion engine according to embodiment 1, therefore like elements will be denoted by like reference numerals, and a description thereof will be omitted.

<$O_3$ Production Method>

Here, a method of producing $O_3$ by the $O_3$ production apparatus 7 according to this embodiment will be described. In this embodiment, while the operation state of the internal combustion engine 1 is a decelerating operation state, electric power is generated by the motor generator 23. In this embodiment, if the charge amount of the battery 9 is larger than a second specific charge amount when the operation state of the internal combustion engine 1 is a decelerating operation state, voltage is applied to the plasma generation apparatus 8 of the $O_3$ production apparatus 7 by the motor generator 23 to generate a plasma, whereby $O_3$ is produced.

Here, the second specific charge amount is a value equal to or higher than a threshold value that allows a determination that the charge amount of the battery 9 is unduly small if the charge amount of the battery 9 is not larger than the second specific charge amount.

According to this embodiment, $O_3$ is generated using electric power generated by the motor generator. Thus, deterioration of the fuel economy caused by production of $O_3$ can be further suppressed.

According to this embodiment, if the charge amount of the battery 9 is not larger than the second specific charge amount when the operation state of the internal combustion engine 1 is a decelerating operation state, electric power generated by the motor generator 23 is supplied to the battery 9. Thus, the charge amount of the battery 9 can be prevented from becoming unduly small.

In this embodiment also, the NOx storage promotion control same as that in embodiment 1 and the filter regeneration control same as that in embodiment 2 are executed.

Although in the above-described embodiments 1 to 3, descriptions have been made of cases in which exhaust gas is introduced into the $O_3$ production apparatus, and $O_3$ is produced by changing $O_2$ in the exhaust gas into $O_3$, the $O_3$ production apparatus 7 may be adapted in such a way that outside air (or ambient air) is introduced into it. When this is the case, $O_3$ is produced by changing $O_2$ in outside air (or ambient air) into $O_3$.

In the above-described embodiments 1 to 3, the $O_3$ production apparatus 7 and the $O_3$ tank 10 may be constructed as an integral unit.

The features of the above-described embodiments 1 to 3 may be adopted in any possible combination.

INDUSTRIAL APPLICABILITY

According to the present invention, it is possible to produce $O_3$ to be supplied to the exhaust gas of an internal combustion engine while suppressing deterioration of the fuel economy.

The invention claimed is:

1. An exhaust gas purification system for an internal combustion engine comprising:
   a plasma generator that produces $O_3$, when an operation state of said internal combustion engine is a decelerating operation state in which an engine load becomes lower, to be supplied to exhaust gas of said internal combustion engine by generating a plasma, and that stops producing $O_3$ when an operation state of the internal combustion engine is an operation state other than the decelerating operation state;
   an $O_3$ tank that stores $O_3$ produced by the plasma generator, and
   an NOx storage reduction catalyst provided in an exhaust passage of said internal combustion engine,
   wherein $O_3$ stored in the $O_3$ tank is supplied to exhaust gas flowing in an exhaust passage upstream of said NOx storage reduction catalyst when the operation state of said internal combustion engine is an accelerating operation state in which the engine load becomes higher.

2. An exhaust gas purification system for an internal combustion engine according to claim 1, wherein the higher an increase rate of the engine load of said internal combustion engine is, or the lower the temperature of said NOx storage reduction catalyst is, the larger the quantity of $O_3$ supplied to the exhaust gas is made.

3. An exhaust gas purification system for an internal combustion engine comprising:
   a plasma generator that produces $O_3$, when an operation state of said internal combustion engine is a decelerating operation state in which an engine load becomes lower, to be supplied to exhaust gas of said internal combustion engine by generating a plasma, and that stops producing $O_3$ when an operation state of the internal combustion engine is an operation state other than the decelerating operation state;
   an $O_3$ tank that stores $O_3$ produced by the plasma generator, and
   a particulate filter that is provide in an exhaust passage of said internal combustion engine and traps particulate matter in exhaust gas, wherein $O_3$ stored in said $O_3$ tank is supplied to said particulate filter when removing particulate matter trapped in said particulate filter.

4. An exhaust gas purification system for an internal combustion engine according to claim 3, wherein when removing particulate matter trapped in said particulate filter while the operation state of said internal combustion engine is a decelerating operation state in which the engine load becomes lower, $O_3$ produced by the plasma generator is supplied to said particulate filter without being stored in said $O_3$ tank.

5. An exhaust gas purification system for an internal combustion engine according to claim 1, wherein said internal combustion engine is mounted on a hybrid vehicle that can selectively use, as driving power, one or both of power output of the internal combustion engine and power output of a motor generator, and the plasma generator produces $O_3$ by generating a plasma using electric power generated by said motor generator when the operation state of said internal combustion engine is a decelerating operation state in which the engine load becomes lower.

6. An exhaust gas purification system for an internal combustion engine according to claim 2, wherein said internal combustion engine is mounted on a hybrid vehicle that can selectively use, as driving power, one or both of power output of the internal combustion engine and power output of a motor generator, and the plasma generator produces $O_3$ by generating a plasma using electric power generated by said motor generator when the operation state of said internal combustion engine is a decelerating operation state in which the engine load becomes lower.

7. An exhaust gas purification system for an internal combustion engine according to claim 3, wherein said internal combustion engine is mounted on a hybrid vehicle that can selectively use, as driving power, one or both of power output of the internal combustion engine and power output of a motor generator, and the plasma generator produces $O_3$ by generating a plasma using electric power generated by said motor generator when the operation state of said internal combustion engine is a decelerating operation state in which the engine load becomes lower.

8. An exhaust gas purification system for an internal combustion engine according to claim 4, wherein said internal combustion engine is mounted on a hybrid vehicle that can selectively use, as driving power, one or both of power output of the internal combustion engine and power output of a motor generator, and the plasma generator produces $O_3$ by generating a plasma using electric power generated by said motor generator when the operation state of said internal combustion engine is a decelerating operation state in which the engine load becomes lower.

9. An exhaust gas purification system for an internal combustion engine according to claim 5, wherein if a charge amount of a battery is larger than a specific charge amount when the operation state of said internal combustion engine is a decelerating operation state in which the engine load becomes lower, the plasma generator produces $O_3$ by generating a plasma using electric power generated by said motor generator.

10. An exhaust gas purification system for an internal combustion engine according to claim 6, wherein if a charge amount of a battery is larger than a specific charge amount when the operation state of said internal combustion engine is a decelerating operation state in which the engine load becomes lower, the plasma generator produces $O_3$ by generating a plasma using electric power generated by said motor generator.

11. An exhaust gas purification system for an internal combustion engine according to claim 7, wherein if a charge amount of a battery is larger than a specific charge amount when the operation state of said internal combustion engine is a decelerating operation state in which the engine load becomes lower, the plasma generator produces $O_3$ by generating a plasma using electric power generated by said motor generator.

12. An exhaust gas purification system for an internal combustion engine according to claim 8, wherein if a charge amount of a battery is larger than a specific charge amount when the operation state of said internal combustion engine is a decelerating operation state in which the engine load becomes lower, the plasma generator produces $O_3$ by generating a plasma using electric power generated by said motor generator.

* * * * *